March 3, 1959 B. H. HAGELTORN Re. 24,613

PLASTIC STRIPS

Original Filed Sept. 17, 1953 4 Sheets-Sheet 1

Inventor
BROR HENRIK HAGELTORN by Hill, Sherman, Meroni, Gross & Simpson Attys.

Inventor
BROR HENRIK HAGELTORN by Hill, Sherman, Meroni, Gross & Simpson Attys

Inventor
BROR HENRIK HAGELTORN by Hill, Sherman, Meroni, Gross & Simpson Attys.

Inventor
BROR HENRIK HAGELTORN by Hill, Sherman, Meroni, Gross & Simpson Attys.

United States Patent Office

Re. 24,613
Reissued Mar. 3, 1959

24,613

PLASTIC STRIPS

Bror Henrik Hageltorn, Halsingborg, Sweden, assignor, by mesne assignments, to Cisatlantic Corporation, New York, N. Y., a corporation of New York Original No. 2,739,089, dated March 20, 1956, Serial No. 380,847, September 17, 1953. Application for reissue September 23, 1957, Serial No. 689,023

Claims priority, application Sweden October 7, 1952

7 Claims. (Cl. 154—43)

Matter enclosed in heavy brackets [ ] appears in the original patent but forms no part of this reissue specification; matter printed in italics indicates the additions made by reissue.

The present invention relates to certain new and useful improvements in strips made of a resilient plastic material and is mainly characterised by the fact that the strip is formed at or near each one of its longitudinal edges with one or more beads and grooves extending in the longitudinal direction of the strip and formed as engagement elements in such a manner that, upon pressing one strip edge against the other, said beads will enter into releasable locking interengagement both transversely of the strip and in a direction perpendicularly to said strip solely by the action of the lateral resiliency of said beads.

A strip of this nature will be of an extremely high versatility in its applications, such as for the insulation of piping and electrical cables, for wrapping around articles for ornamental or protecting puposes, or for manufacturing belts and like articles of any desired width, etc.

[The engagement elements may be formed on the same side of the strip, or they may be formed on opposite sides thereof.]

*The engagement elements are formed on opposite sides of the strip so that the one or more beads at one edge of the strip face in the opposite direction from the plane of the strip from the corresponding groove or grooves along the other edge, and vice versa.* The beads and grooves may suitably be formed with hook-shaped portions which, upon one strip edge being pressed against the other, will be moved into engagement with each other by the action of the lateral resiliency of the resilient beads.

It will be understood, however, that the interengagement between the strip edges aimed at according to the invention may be obtained in many other ways, as well. Thus, for instance, the beads may be formed with increasing width towards their tops whilst the width of the grooves increases correspondingly towards their bottoms whereby, upon being depressed into the groove, or grooves, said bead, or beads, will get a dove-tail connection with the grooved edge of the strirp. Thus, the essential feature of the invention resides in that one and the same strip is formed at or near each one of its longitudinal edges with two longitudinally extending bead-shaped engagement elements, or groups of engagement elements, capable of being moved into locking interengagement.

For the production of the strips a plastic material of any suitable kind may be used, such as nylon, orlon, Dynel, Dacron, Aerilon, Vicara, or rubber, and the production may suitably be carried out in a continuous string casting process. The strips may if necessary, be reinforced or they may be given other characteristics adapting the strips to specialized purposes, for example, by covering the same with textile threads or the like of any suitable material, such as of a heat insulating or electrically insulating material.

Further features and advantages of the invention will be explained in the following description in conjunction with the accompanying drawings illustrating by way of example various embodiments thereof, and in which:

Fig. 1 shows a strip in perspective view and cross-section.

Fig. 2, to a larger scale, illustrates how the bead-shaped locking elements formed at the two edges of the strip engage each other in the course of wrapping the strip around an article.

Fig. [9]*8* illustrates a strip according to the invention in the action of being circularly closed into a tubular structure with a longitudinally extending seam.

Figure 1:
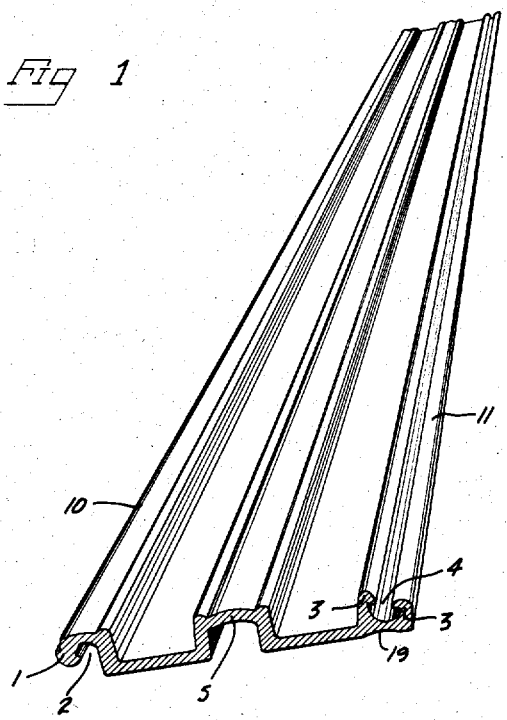
Figure 2:
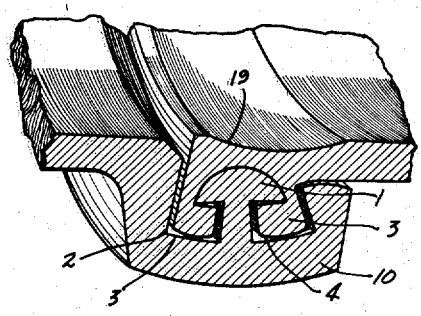

With reference to Figs. 1 and 2 of the accompanying drawings, it will be seen that the strip is provided along one of its longitudinal edges with a double-sidedly hook-shaped bead 1 and with a groove 2 whilst the other edge of the strip is formed with two simple hook-shaped beads 3 forming between them a groove 4 complementary to the bead 1, whereby, upon wrapping the strip around an object, such as a tubular or other circular or non-circular structure, the bead 1 at one edge of the strip can be sprung into the groove at the other edge of the strip causing the beads 1 and 3, 3 to enter into locking interengagement, whereby the two edges of the strip will be securely interconnected both transversely of the strip and in a direction perpendicularly thereto.

The strip illustrated in Fig. 1 is formed with a resilient channel-shaped bead 5 extending longitudinally between its ends whereby, upon the strip being wound around an object, the strip will be able to adapt itself more exactly to the contour thereof.

Figure 3:
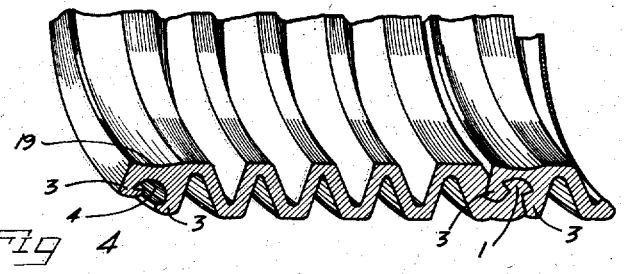
Figs. 3 and 4 are somewhat similar showing of a slightly modified strip.

Fig. 3 illustrates a strip having locking beads 3 and grooves 4 approximately identical with those of Figs. 1 and 2, but the strip is completely corrugated between its longitudinal edges in order to provide for a still better lateral resiliency.

Figure 4:
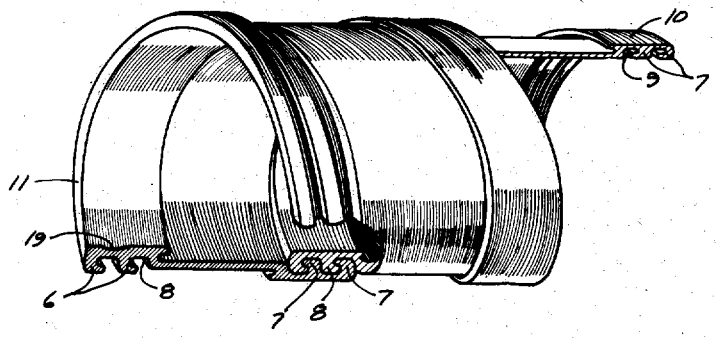
Figure 5:
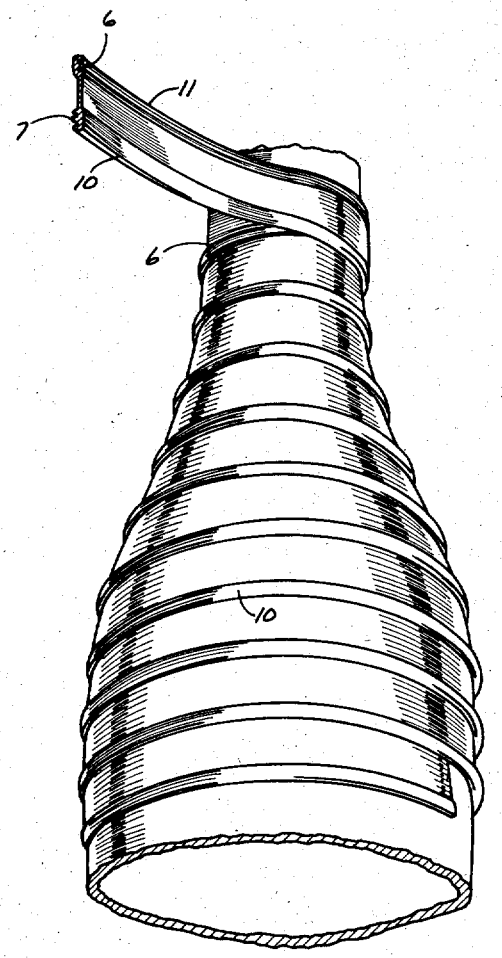
Fig. 5 illustrates a strip being wound around a tube of varying diameter.

According to Fig. 4, each strip edge is provided with two single-sided hook-shaped beads 6 and 7 and intervening grooves 8 and 9, respectively. Fig. 5 illustrates a strip substantially corresponding to that of Fig. 4 in the operation of being wound about a tubular structure of varying diameter, and it will be clearly seen from this figure how the bead-shaped locking elements 7 at one edge 10 of the strip are caused to engage the complementary locking elements 6 at the other edge 11 of the strip.

Figure 6:
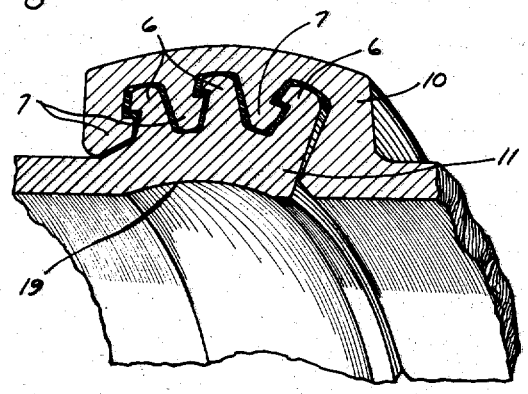
Figs. 6 and 7 show two further embodiments of the invention applied to a strip being formed at both edges with bead-shaped locking elements.
Figure 7:
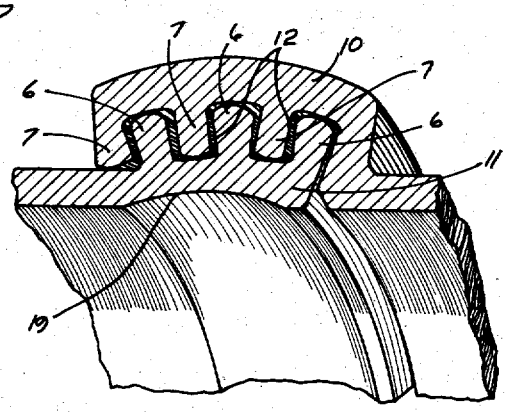

Figs. 6 and 7 illustrate a further couple of embodiments of the locking beads formed at the two longitudinal edges of the strip, in which, according to Fig. 6, three hook-shaped beads 7 are used at one edge 10 and three complementary hook-shaped locking beads 6 at the other edge 11. In the embodiment according to Fig. 7, one strip edge 11 has three beads 6 increasing in width towards their tips, whilst, on the other hand, the complementary grooves 12 between the beads 7 at the other strip edge 10 increase in width towards their bottoms. In this way, it will be seen, a positive locking interconnection will be obtained between the edges 10 and 11 of the strip when the latter are pressed towards each other.

Figure 8:
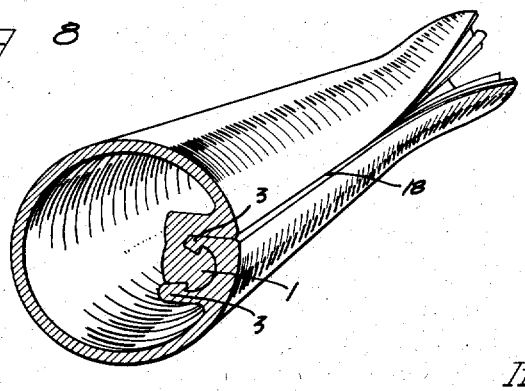
[Fig. 8 illustrates an embodiment in which the beads are formed at the strip edges proper.]

[In the embodiment according to Fig. 8, the bead-shaped locking element formed at one edge of the strip consists of two hook-shaped beads 13 projecting approximately in parallel relation with the plane of the strip and forming between them a groove 14 into which a bead 17 at the other edge of the strip and projecting laterally in the plane of the strip and formed with hook-shaped portions 15, 16 is adapted to be forced when the strip is being coiled together.]

Fig. [9]*8* illustrates how a strip of the invention can be laterally bent into the form of a tubular structure having a seam 18 extending in the longitudinal direction of the strip. The beads in this embodiment are shown as being of a shape approximately the same as that of the embodiment according to Fig. 1.

In the majority of the embodiments illustrated the strip is shown as being formed adjacent its edge 11 and in the surface thereof opposite to the locking elements with a longitudinally extending depression or groove 19, see for instance Figs. 1 and 2, which may be arcuate. The purpose of this expedient is, upon the strip being wound about an object, to cause this depression to be pressed flat to a higher or lower degree by the action of pressing the strip against said object, whereby the bead-shaped locking elements will be still more rigidly interengaged, as will be apparent to anyone skilled in the art.

[In the foregoing description the bead-shaped locking elements have been described and illustrated as being arranged in such a manner that the beads at one strip edge project towards one side of the strip whilst the beads at the other strip edge project towards the opposite side of the strip. Such an arrangement would be preferable for most purposes, although for certain special types of windings the beads can be arranged at the same side of the strip.]

*By virtue of the engagement elements being formed on opposite sides of the strip, so that one or more beads at one edge of the strip face in an opposite direction from the plane of the strip from the corresponding groove or grooves along the other edge, the forming of the strip into a tube, either spirally (helically) or longitudinally jointed, is greatly facilitated. In either case, the strip is bent in such manner that the engagement elements overlap and are in a confronting relationship such that they can be interfitted. Interfitting to form a closed joint is then effected by the application of forces substantially normal to the plane of the strip and directed toward the plane of the strip. Such interfitting provides a releasable locking interengagement of the corresponding beads and grooves solely by virtue of their resilient deformability and their elastic reversion to their normal shape in cross-section. The joint so formed can be simply and quickly released, or opened, by the application of separating forces also acting substantially normal to the plane of the tube but directed away from the plane of the tube, that is in opposite directions from such plane.*

Having now particularly described the nature of my invention and the manner of its operation what I claim is:

1. An elongated strip of resilient *plastic* material formed with at least one projection extending longitudinally of the strip, out of the plane of the strip, substantially perpendicular to the plane of the strip and adjacent to one of its longitudinal edges, and with at least one recess extending longitudinally of the strip, out of the plane of the strip, substantially perpendicular to the plane of the strip and adjacent to the other of its longitudinal edges, the recess and projection being formed on opposite sides of the strip [as interfitting elements providing a joint when the strip is spiral wrapped into a tube and adapted to interfit out of the plane of the tube.] *and being adapted when the strip is spirally wrapped into a tube and the confronting edges are pressed toward each other into locking interengagement to provide a*

*joint that is releasable upon a separating force being applied to said edges normal to the plane of the tube.*

2. An improved strip as claimed in claim 1, in which, in order to improve the locking interengagement between the recess and the projection by stretching upon winding the strip around an object, said strip is provided with a depression extending longitudinally on the side of the strip opposite to that carrying said projection.

3. An improved strip as claimed in claim 1, in which, in order to provide for better lateral resiliency, the strip is provided with longitudinally extending corrugations.

*4. An elongated strip of resilient plastic material provided adjacent its respective longitudinal edges with at least one bead and at least one corresponding groove extending continuously therealong in parallel relationship, said bead and said groove facing in opposite directions from the plane of said strip with their respective height and depth median planes substantially perpendicular to the plane of said strip and said bead and groove being normally of such complemental shape in cross-section that when one edge of said strip overlaps the other with said bead and groove in confronting relation and the edges are urged toward each other said bead and groove releasably interengage solely by virtue of their resilient deformability and become interlocked by reversion to their normal shape in cross-section, thereby forming a joint that can be opened by a mere reversal of the forces required to releasably interengage said bead and groove.*

*5. An elongated strip of resilient plastic material having a plurality of beads and grooves extending continuously in parallel relationship along each of the longitudinal edges thereof, the beads and grooves along one edge facing in an opposite direction from the plane of said strip from the beads and grooves along the other edge with their respective height and depth median planes extending out of the plane of said strip, the beads along one edge having a cross-section corresponding to the cross-section of the grooves along the other edge and the respective cross-sections being such that the beads may be forced into the corresponding grooves in interlocking engagement therewith due to the resiliency of the material thereof when the strip is formed into a tube with the longitudinal edges overlapping and with the respective beads and grooves of one of said edges confronting the corresponding grooves and beads of the other of said edges, thereby forming a joint that can be opened by a mere reversal of the forces required to effect the aforesaid interlocking engagement.*

*6. Resilient plastic strip material of extended length provided along its respective longitudinal edges with a plurality of beads and grooves extending continuously therealong in parallel relationship, the beads and grooves along one edge facing in an opposite direction from the plane of said strip from the beads and grooves along the other edge of said strip with their respective height and depth median planes substantially perpendicular to the plane of said strip, said beads having hook-shapes in cross-section and said grooves having a corresponding cross-section such that when the strip is formed into a tube with the longitudinal edges overlapping and with the respective beads and grooves of one of said edges confronting the corresponding grooves and beads of the other of said edges and said edges are urged together the beads and grooves are forced into releasable interengagement by virtue of their resilient deformability and become interlocked by return to their normal undeformed cross-section, thereby forming a joint that can be released by a mere reversal of the forces required to force said beads and grooves into the aforesaid releasable interengagement.*

*7. Resilient plastic strip material of extended length provided along its respective longitudinal edges with a plurality of beads and grooves extending continuously*

*therealong in parallel relationship, the beads and grooves along one edge facing in an opposite direction from the plane of said strip from the beads and grooves along the other edge of said strip with their respective height and depth median planes substantially perpendicular to the plane of said strip, said beads having an enlarged head and a restricted neck in cross-section and said grooves being of complementary shape in cross-section such that when the strip is formed into a tube with the longitudinal edges overlapping and with the respective beads and grooves of one of said edges confronting the corresponding grooves and beads of the other of said edges and said edges are urged together by forces substantially normal to the plane of said strip the beads and grooves are forced into releasable interengagement by virtue of their resilient deformability and become interlocked by return to their normal undeformed cross-section, thereby forming a joint that can be released*

*by a mere reversal of the forces required to force said beads and grooves into the aforesaid releasable interengagement.*

References Cited in the file of this patent or the original patent

UNITED STATES PATENTS

| | | |
|---|---|---|
| 1,570,886 | Fulton et al. | Jan. 26, 1926 |
| 1,841,199 | Nolte | Jan. 12, 1932 |
| 1,933,279 | Quarnstrom | Oct. 31, 1933 |
| 2,354,485 | Slaughter | July 25, 1944 |
| 2,558,367 | Madsen | June 26, 1951 |
| 2,606,352 | Wende | Aug. 12, 1952 |
| 2,613,421 | Madsen | Oct. 14, 1952 |
| 2,680,698 | Schnee | June 8, 1954 |

FOREIGN PATENTS

| | | |
|---|---|---|
| 243,660 | Great Britain | Dec. 3, 1925 |